March 25, 1952
M. A. SCHLESINGER
2,590,130
APPARATUS FOR PROJECTING IMAGES
FROM TELEVISION RECEIVERS
Filed March 5, 1949
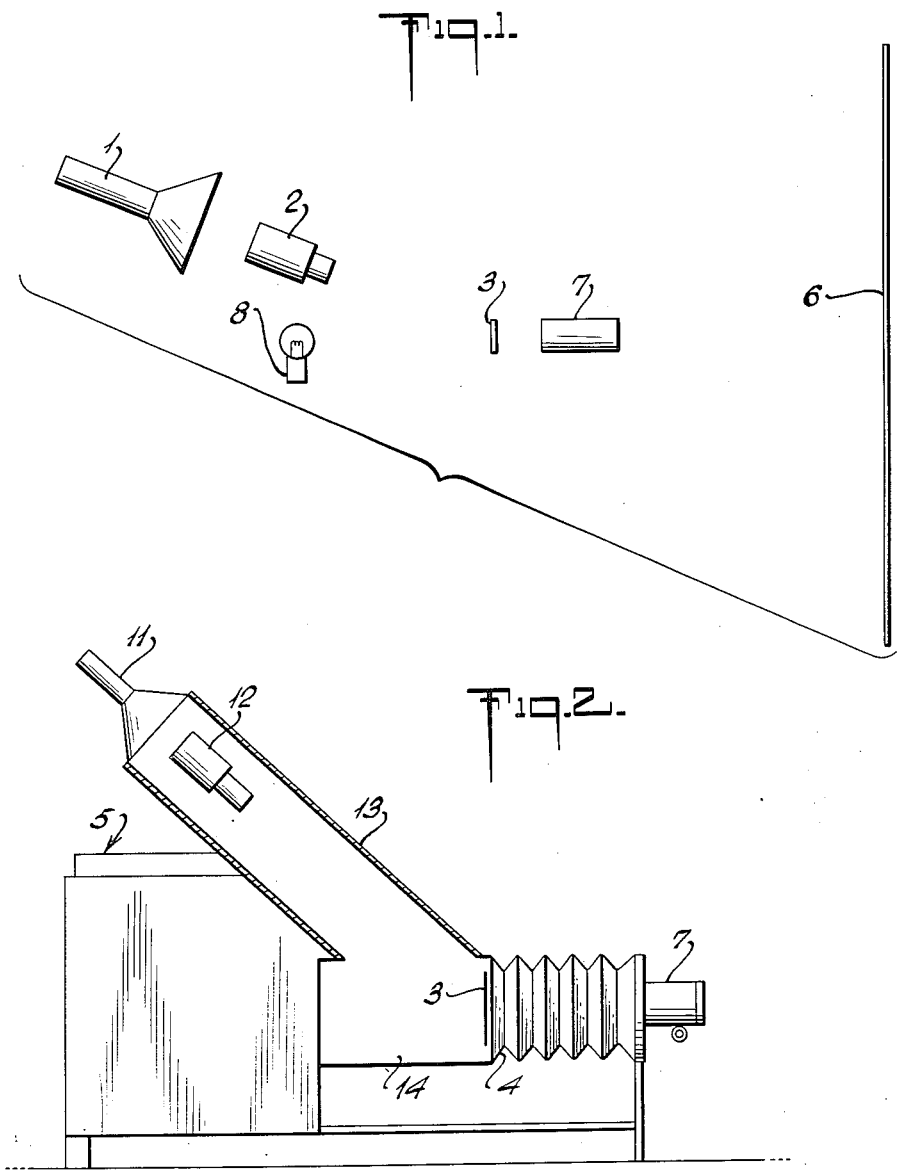
INVENTOR
MAX A. SCHLESINGER.
BY
ATTORNEY Patented Mar. 25, 1952

2,590,130

UNITED STATES PATENT OFFICE 2,590,130

APPARATUS FOR PROJECTING IMAGES FROM TELEVISION RECEIVERS

Max A. Schlesinger, New York, N. Y.

Application March 5, 1949, Serial No. 79,812

3 Claims. (Cl. 177—316)

1

This invention pertains to improvements in apparatus for projecting images from a television receiver, one object of the invention being the provision of an apparatus to be used in conjunction with a television receiver and a motion picture projector or lantern slide projector, of an optical system which receives the image from the fluorescent screen of the television receiver on to a ground glass field or phosphor screen supported in the picture frame aperture of the projector, of either type, so that such image thus produced on such ground glass can be enlarged and projected on a screen, thus providing means for an enlarged picture to be produced to be viewed without the necessity of standing or sitting close to the television receiver.

Heretofore, several means have been provided for projecting enlarged images directly from the fluorescent screen of a cathode ray tube in a television receiver, but instead of utilizing the rays from the cathode of said tube to project the enlarged image, or to use an additional projecting light at the rear and to be projected directly though such fluorescent screen, it is here proposed to optically present the image from the fluorescent screen of the cathode ray television tube upon a ground glass fluorescent screen or one that contains its own illumination, such as beaded gas or neon gas filled screen, and then utilize an independent light projector which directs its rays through said latter screen and then through an optical system to an enlarged screen, and one disconnected from and at a distance from the television receiver.

In order that the invention may be understood and its numerous advantages appreciated, attention is invited to the accompanying drawings, in which:

Figure 1 is a diagrammatic view of the entire invention, showing the same as applied to a projector of either type.

Figure 2 is a detail view of the invention as applied to a slide projector, the lamp house being shown in side elevation and the lamp thereof not shown.

Referring to the drawings, the numeral 1 designates a cathode ray tube of the normal television receiver, and 2 an optical system, composed of the usual mirror, prism and reducing lens, which directs a reduced image upon a ground glass or image receiving screen 3, disposed in a stationary position in the picture frame position 4, of a projector 5, here shown as a still or lantern slide projector. This may be of the model CL Balopticon, designed for distant

2 projection, or it may be a 35 mm. or 16 mm. motion picture projector.

To project and thus produce an enlarged image upon the receiving screen 6, a lens system 7, usually an element of both types of projectors, when the lamp 8 is energized, will cause the image on the ground glass or image receiving screen 3, will then be presented upon the enlarged screen 6, as a motion picture, but without the use of a film, or slide, and without the necessity of operating the intermittent motion of the motion picture projector, the lantern slide projector being more desirable, as the lens 7 thereof through the medium of the bellows 9 can be adjusted to regulate the clearness of the picture upon the screen 6.

As shown in Fig. 2, the lantern slide projector 5, has the image from the tube 11, projected by its optical system 12, through a light tight enclosure 13, into the housing 14, and thence upon a ground glass or image receiving screen 3, placed in the position normally occupied by the slide and its holder. In fact the ground glass or image receiving screen in this instance is in the form of the slide and is substituted therefor when the lantern slide projector is made a part of this apparatus.

From the foregoing description taken in connection with the drawings it is evident that by utilizing the image on the television tube, that a projector of the types set forth can be utilized to enlarge the picture and project the same upon a regular screen designed for presenting motion pictures and lantern slides, and that no moving parts or motors are necessary, as the projecting lamp is the only mechanism that requires the attention of the operator.

The ground glass 3 may be frosted glass as is used in cameras, or a fluorescent or luminescent solids screen that will contain its own illumination, or a finely vertically corrugated sheet, the corrugations being from 500 to 1,000 lines to the inch.

It is known that the image projected by the tube 1—11, will be lessened in density when projected by the lamp 8, but the image upon the screen 6, though of a paler grey, for instance, will have sufficient grades of lights and shadows to provide a picture that is visible to a greater number of persons than when the picture on the tube's face is being observed.

With the present arrangement, the method employed consists of optically projecting from the fluorescent screen of the tube 1, the image impressed thereon upon an external and spaced screen 3, which latter is reduced in size to receive a finer or closer lined image; and then by means of the light source 8 and an optical system 7, projecting the second image, that is of the screen 3, upon a large receiving screen, such as a motion picture screen 6. This is very important, as the above elements that permit the use of this method, except the screen 6, can be embodied in one machine, using a "still" projector, and putting the screen 3 where the slides are placed. The main addition to the said projector is the inclined light tight enclosure 13.

It is also possible to use opaque objects, that is to project the image from the tube 1, as for instance upon a stationary opaque white surface, and then use a projector having a lamp and mirrors to project the image then shown upon the screen of the tube 1.

What is claimed is:

1. An apparatus for producing enlarged images upon a distant receiving screen from a television receiver's cathode ray tube's fluorescent screen, including in combination, a cathode ray tube having a fluorescent image receiving screen, an illuminated screen externally spaced from the tube and disposed to receive the image from the tube, an optical system externally of the tube for concentrating the image of the tube upon the illuminated screen, an enlarged screen spaced from the illuminated screen, a second optical system mounted between the two screens, and a source of light disposed to have its rays projected through the illuminated screen and through the second optical system upon the enlarged screen.

2. An apparatus for producing enlarged images from the fluorescent screen of a television receiver, including in combination, a main casing, including a lamp house, a lamp in said house, a bellows adjustably mounted with relation to and spaced from the lamp, an optical system carried at the outer end of the bellows, an image receiving screen mounted at the rear of the bellows and between the lamp and optical system, an enclosure disposed at an angle to the front of the lamp house and carried by the main casing, an optical system mounted therein and focused upon the image receiving screen, and a television cathode ray tube having its screen disposed at the end of the enclosure distal from the screen, whereby the image upon the fluorescent screen of the cathode ray tube is focused upon the screen.

3. An apparatus as claimed in claim 2, wherein the image receiving screen contains its own illumination.

MAX A. SCHLESINGER.

REFERENCES CITED

The following references are of record in the file of this patent:

UNITED STATES PATENTS

| Number | Name | Date |
|---|---|---|
| 1,199,943 | Taylor | Oct. 3, 1916 |
| 1,808,743 | Barkelew | June 9, 1931 |
| 2,172,775 | Schmidt-Ott et al. | Sept. 12, 1939 |
| 2,222,414 | Kudar | Nov. 19, 1940 |
| 2,260,228 | Moller et al. | Oct. 21, 1941 |
| 2,295,443 | Wilson | Sept. 8, 1942 |
| 2,297,443 | Von Ardenne | Sept. 29, 1942 |
| 2,306,407 | Rosenthal | Dec. 29, 1942 |
| 2,316,550 | Bihalke | Apr. 13, 1943 |
| 2,391,430 | Macek | Dec. 25, 1945 |
| 2,435,564 | Atwood | Feb. 10, 1948 |
| 2,469,992 | Rosenthal | May 10, 1949 |
| 2,474,297 | Young | June 28, 1949 |
| 2,510,419 | Ross | June 6, 1950 |